May 9, 1961 J. E. VISTAIN, JR 2,983,515
AUTOMATIC RECORD PLAYER
Original Filed May 11, 1950 9 Sheets-Sheet 1

INVENTOR.
James E. Vistain Jr.
BY
J. W. Douglas
Atty

May 9, 1961 J. E. VISTAIN, JR 2,983,515
AUTOMATIC RECORD PLAYER
Original Filed May 11, 1950 9 Sheets-Sheet 2
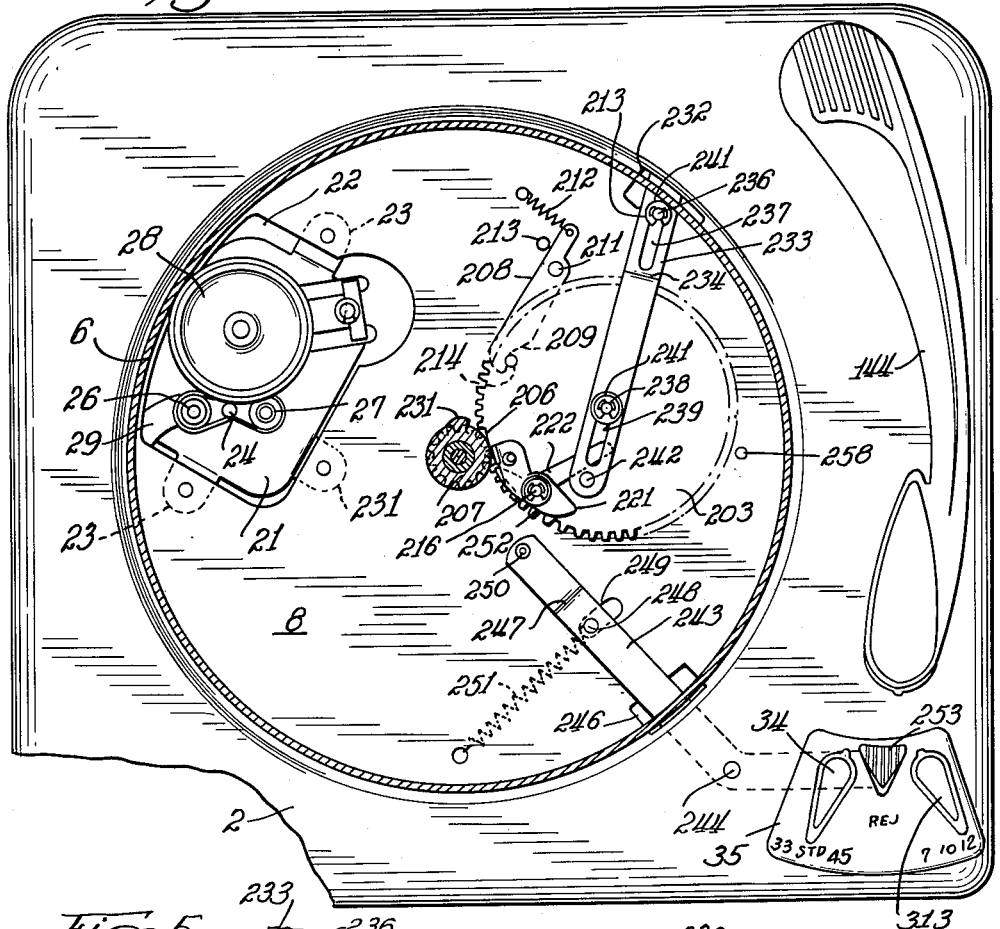
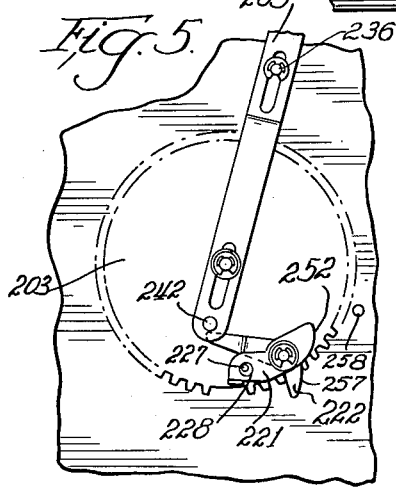
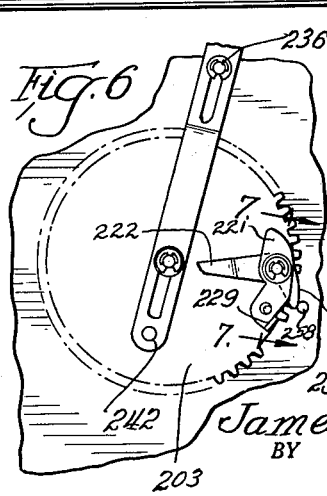
INVENTOR.
James E. Vistain Jr.
BY

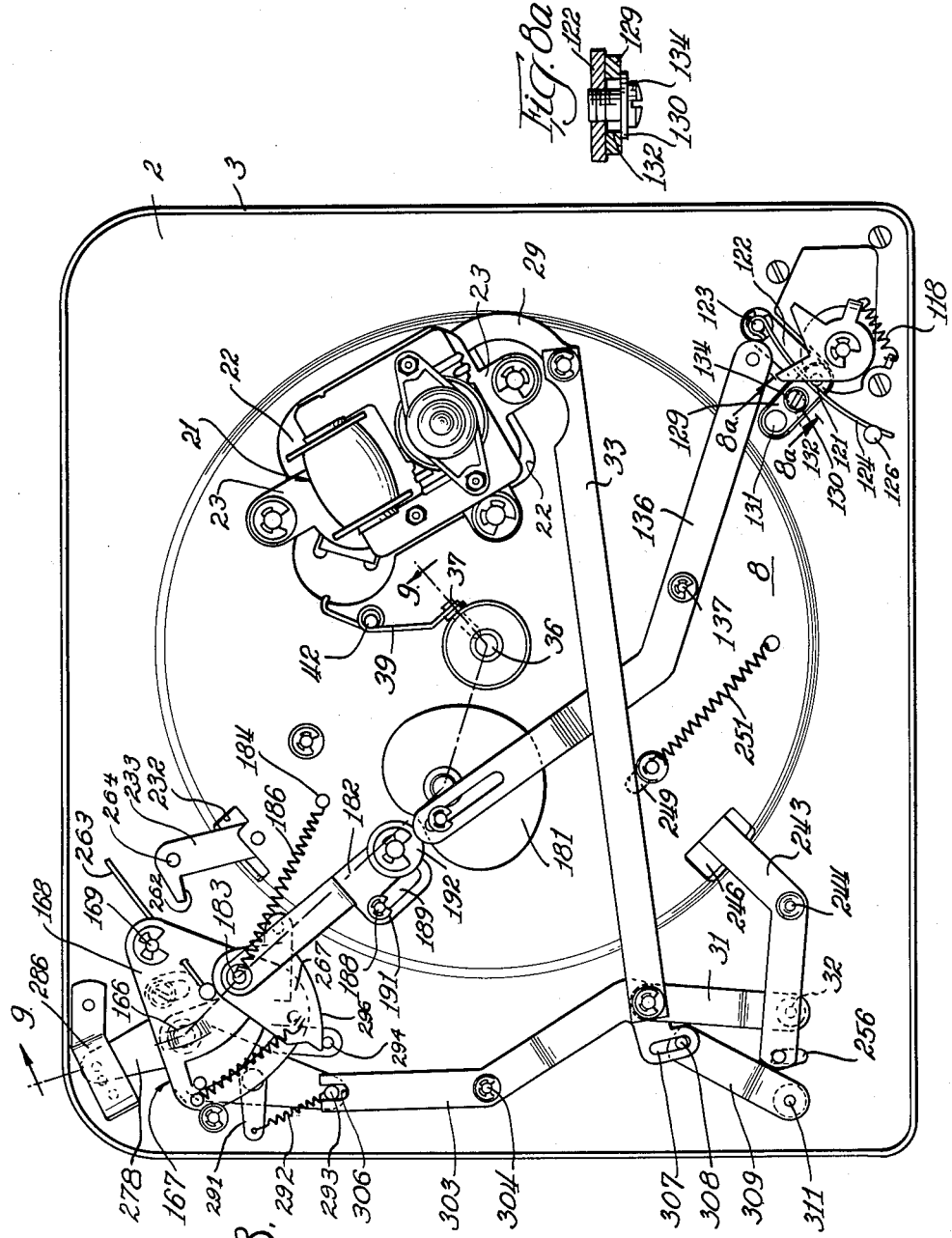

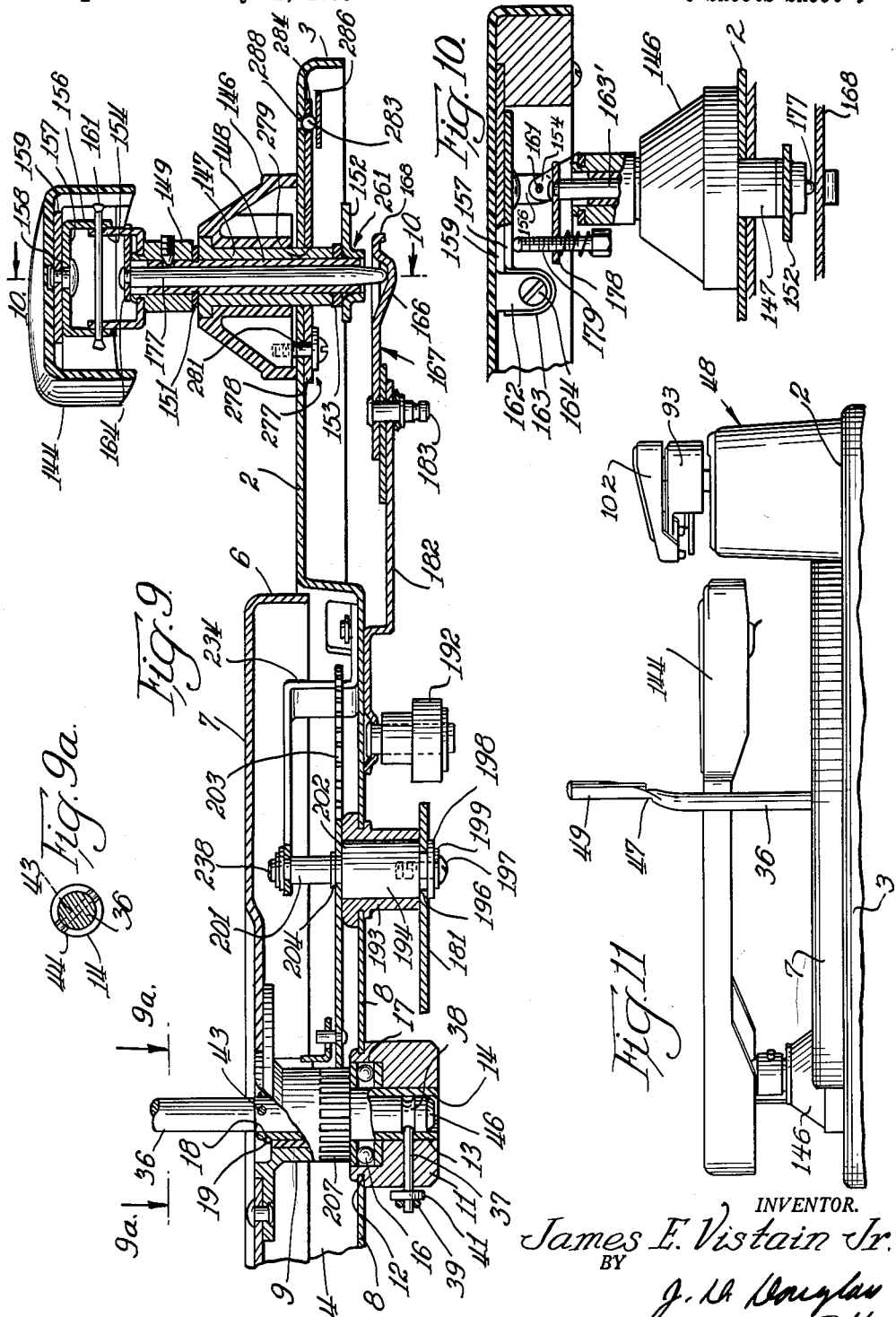

May 9, 1961 J. E. VISTAIN, JR 2,983,515
AUTOMATIC RECORD PLAYER
Original Filed May 11, 1950 9 Sheets—Sheet 5
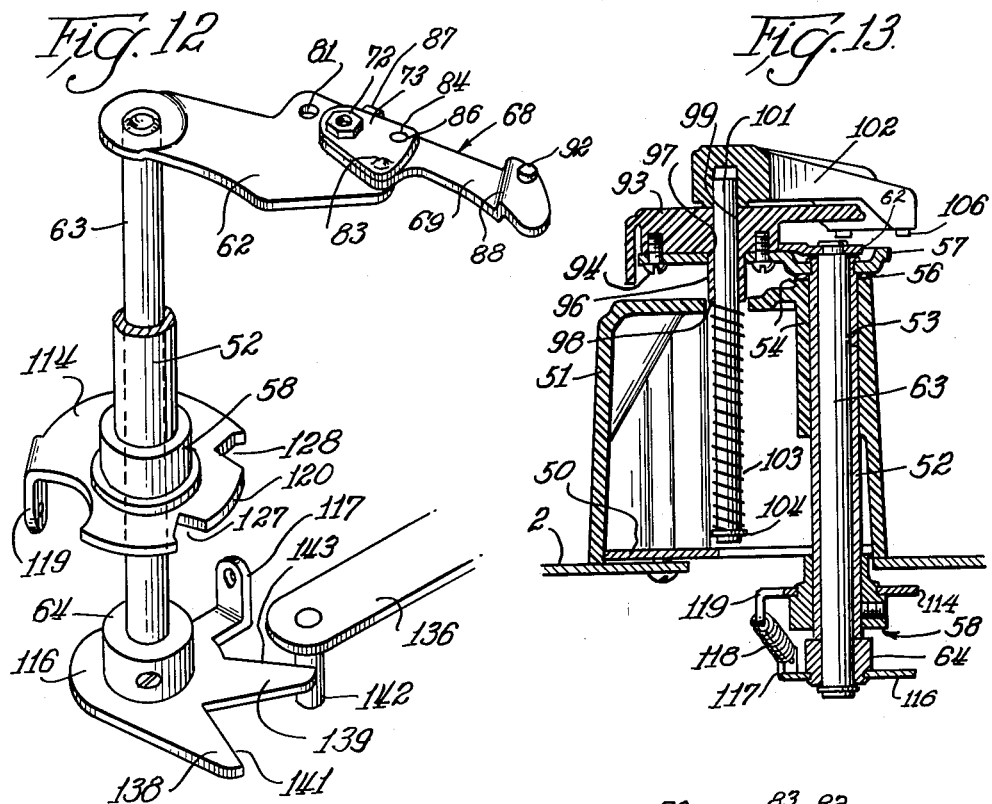
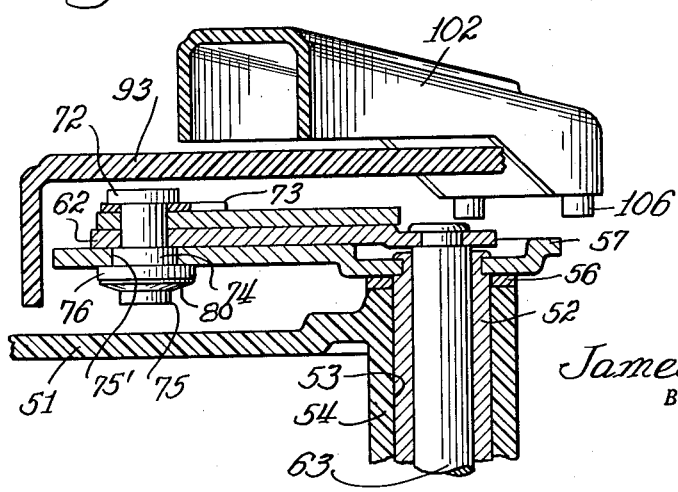
INVENTOR.
James E. Vistain Jr.
BY
J. D. Douglas
Att'y.

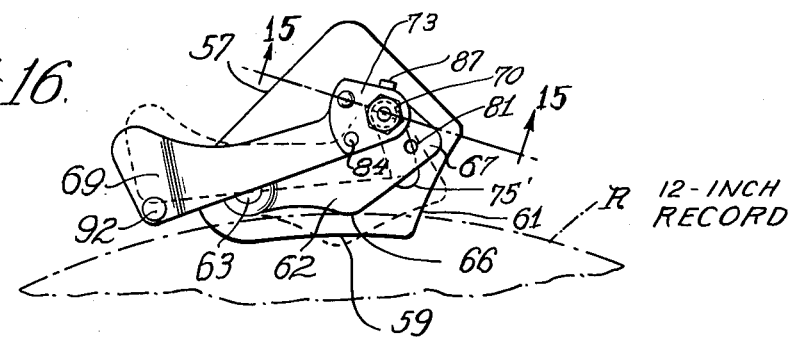
Fig. 16. 12-INCH RECORD
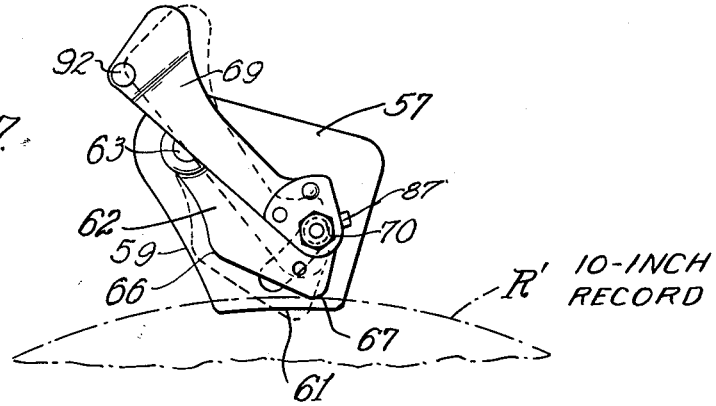
Fig. 17. 10-INCH RECORD
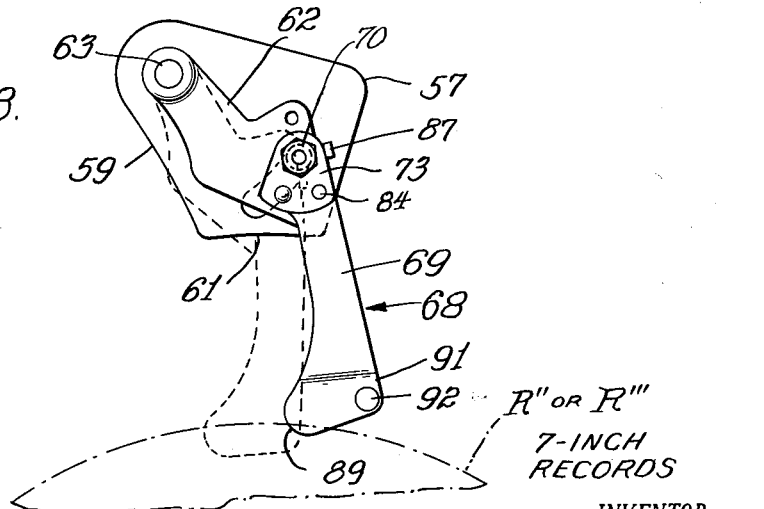
Fig. 18. 7-INCH RECORDS

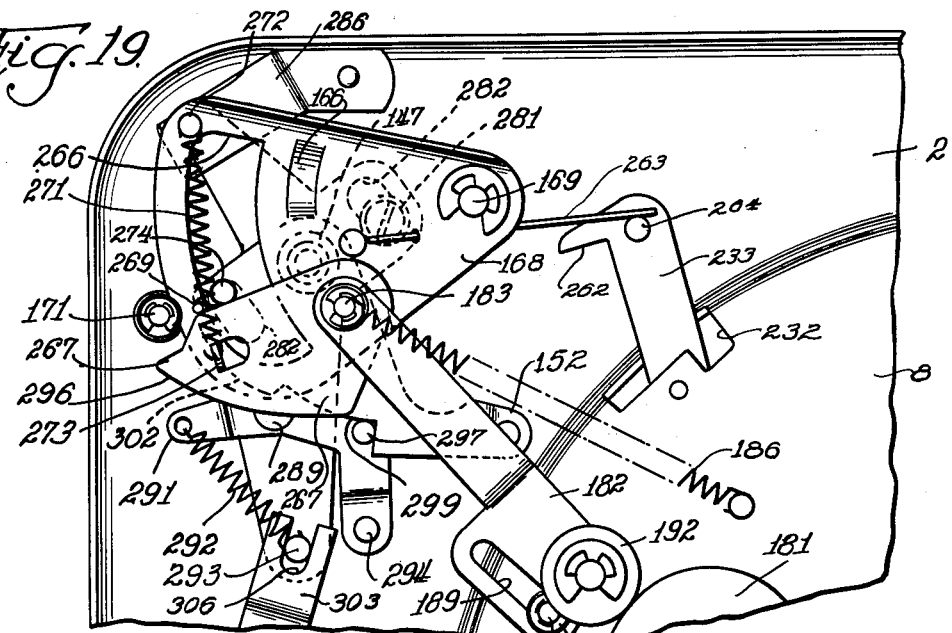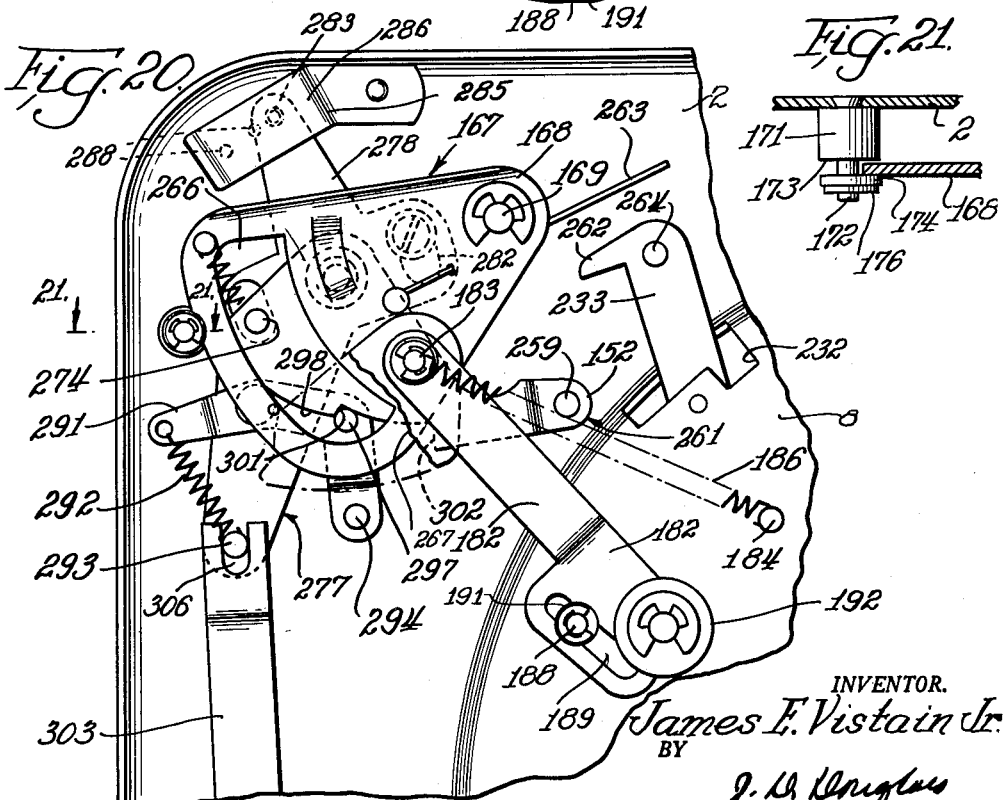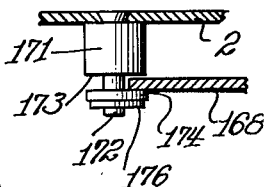

May 9, 1961
J. E. VISTAIN, JR
2,983,515
AUTOMATIC RECORD PLAYER
Original Filed May 11, 1950
9 Sheets-Sheet 8
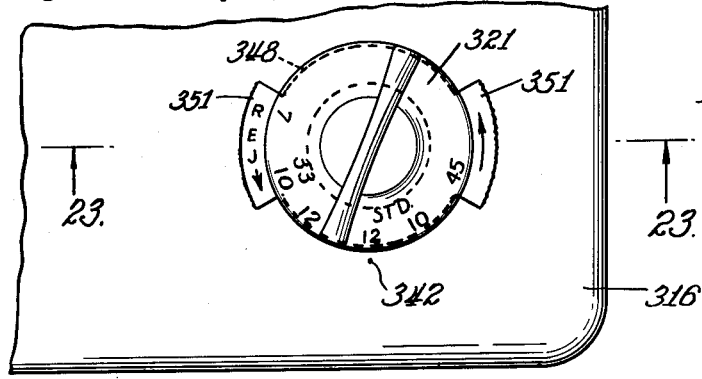
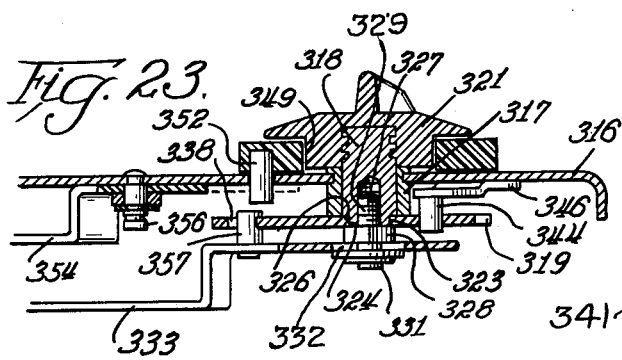
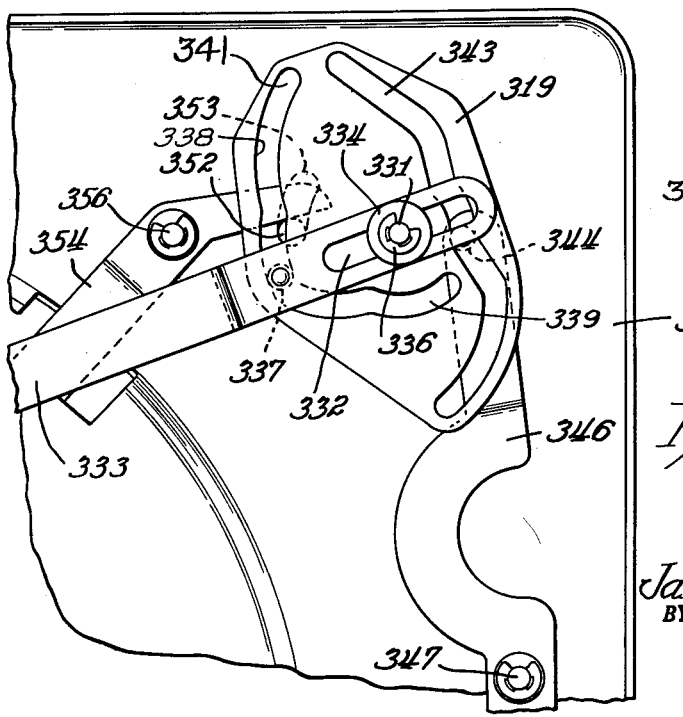
INVENTOR.
James E. Vistain Jr.
BY
J. D. Douglass
Atty.

May 9, 1961 J. E. VISTAIN, JR 2,983,515
AUTOMATIC RECORD PLAYER
Original Filed May 11, 1950 9 Sheets-Sheet 9

INVENTOR.
JAMES E. VISTAIN JR.
BY J. M. Douglas
atty

United States Patent Office 2,983,515
Patented May 9, 1961

2,983,515

AUTOMATIC RECORD PLAYER

James E. Vistain, Jr., Skokie, Ill., assignor to Admiral Corporation, Chicago, Ill., a corporation of Delaware Original application May 11, 1950, Ser. No. 161,370, now Patent No. 2,795,429, dated June 11, 1957. Divided and this application May 22, 1953, Ser. No. 356,739

12 Claims. (Cl. 274—10)

This invention relates to new and useful improvements in phonograph record player mechanism, and more particularly to a record changer of the type wherein the records are disposed in a stack above the turntable and discharged one at a time and in succession onto the turntable. This application is a division of my co-pending application, Ser. No. 161,370 filed May 11, 1950.

A principal advantage made possible by the present invention, as incorporated in my improved record player, is simplicity of construction which, besides affording ease of assembly and consequent reduction in the cost of manufacture, also affords convenience in case of repair. This advantage is gained in view of the increased capacity of the mechanism to reproduce a stack of records of common characteristics. The mechanism is adjustable for playing other stacks of records differing in such characteristics as the speed at which the record must be played, the structure of their terminal or trip grooves, their overall diameters and the size of their center holes. An additional advantage is the manner in which three of the controls are grouped, to be readily accessible at one point on the base plate; one of the controls being for regulating the turntable speed, another for manually rejecting a record, and a third for remotely determining the position at which the pickup arm is adapted to be lowered into initial engagement with a record on the turntable.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention, and, together with the description, serve to explain the principles of the invention.

In the drawings:

Fig. 4 is a view similar to Fig. 1, the top of the turntable being broken away to reveal the structure of underlying parts;

Fig. 5 is a fragmentary view of specific parts shown in Fig. 4, said parts being in a different position;

Fig. 6 is also a fragmentary view corresponding to Fig. 5, the parts being in a position differing from the positions indicated in Figs. 4 and 5;

Fig. 7 is a fragmentary vertical sectional view on line 7—7 of Fig. 6;

Fig. 8 is a bottom plan view of the record player;

Fig. 8a is a vertical sectional view taken on line 8a—8a of Fig. 8;

Fig. 9 is a vertical sectional view taken on line 9—9 of Fig. 8;

Fig. 9a is a horizontal sectional view taken on line 9a—9a of Fig. 9;

Fig. 10 is a vertical section on line 10—10 of Fig. 9 showing the tone arm when the record player is in cycle;

Fig. 11 is a fragmentary view of the record player, in side elevation;

Fig. 12 is a fragmentary perspective view of specific elements of the ejector mechanism;

Fig. 13 is a fragmentary vertical sectional view on line 13—13 of Fig. 1;

Fig. 14 is a fragmentary vertical sectional view, drawn to an enlarged scale, of mechanism shown in Fig. 13, the section being taken on the plane of the vertical rock shaft and the pivotal connection between the record support and ejector plates;

Fig. 15 is a vertical sectional view on line 15—15 of Fig. 16;

Figs. 16, 17 and 18 are diagrammatic plan views of elements of the ejector head showing the provisions made for supporting three different sized records;

Figs. 19 and 20 are fragmentary bottom plan views, drawn to an enlarged scale, of mechanism shown in Fig. 8 to indicate the means employed for lowering the pickup arm into initial engagement with any one of three different sizes of records;

Fig. 21 is a sectional view taken on line 21—21 of Fig. 20;

Fig. 22 is a portion of a second embodiment of the invention, the view corresponding to the elements shown in the lower right hand corner of Fig. 1;

Fig. 23 is a vertical sectional view taken on line 23—23 of Fig. 22;

Fig. 24 is a fragmentary bottom plan view of the elements shown in Fig. 22;

Fig. 25 is a bottom plan view of the cam per se shown in Fig. 24;

Figure 1:
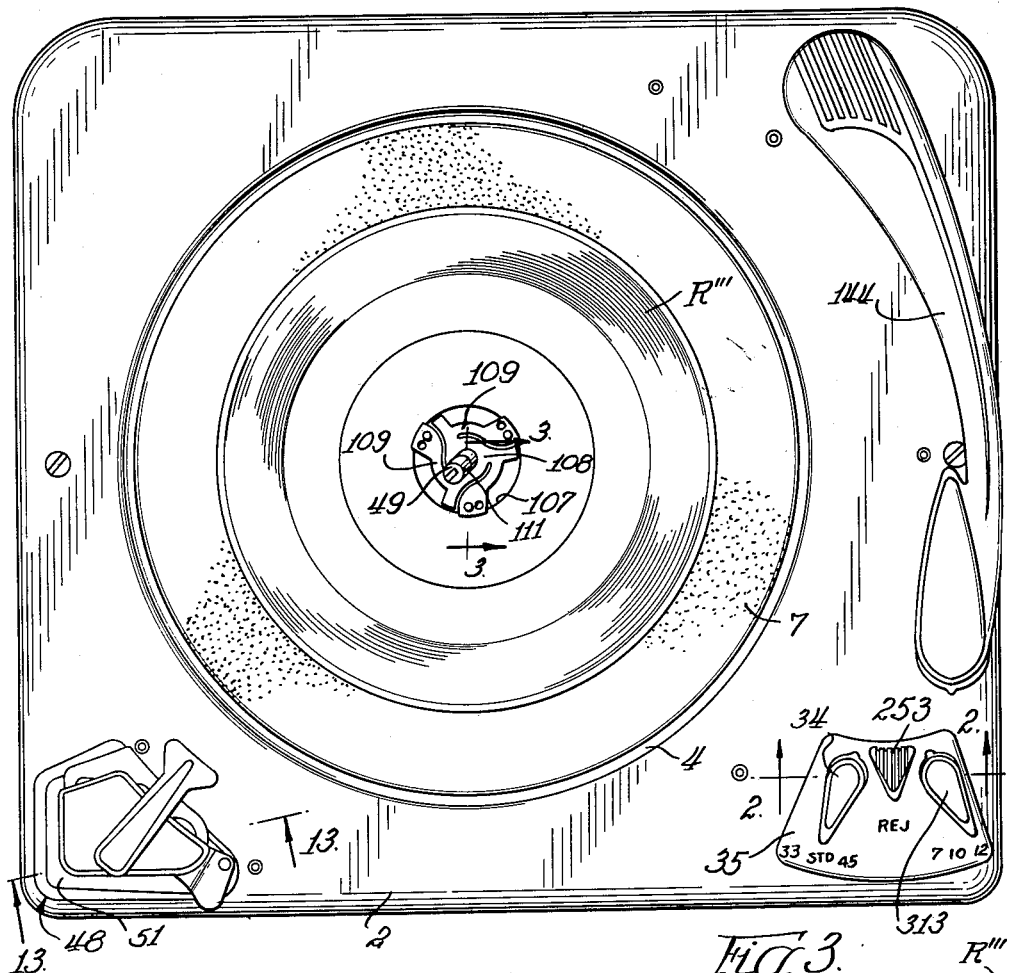
Fig. 1 is a top plan view of a record player in which the novel features are incorporated.

In connection with my improved record player, the reference character 2 is used to denote a chassis or base plate. It is formed preferably of sheet metal which has been drawn to provide a horizontal, rectangular surface from the edges of which a flange 3 extends downward, partly to add rigidity to the plate. Additional rigidity is provided by a cylindrical depression 4 (Fig. 9), centrally of the base plate, in which a depending flange 6 of a conventional turntable 7 is accommodated. The turntable 7 is supported from a lower wall 8, defining the lower extremity of depression 4. The support connection between the turntable and wall 8 comprises a hub 9, on the turntable 7, and a bearing 11 which is rigidly coupled, at its upper end, to the wall 8 at the edge of an aperture 12 therein. Centrally thereof, the bearing 11 is provided with a bore 13 in which is rigidly mounted a tubular shaft 14 which provides a stationary support about which the turntable hub 9 is adapted to turn. The hub is spaced from bearing 11 by a conventional thrust type of ball bearing 16 pocketed within a counterbore 17 in the bearing 11. If desired, the upper end of tubular shaft 14 may be annularly grooved at 18 to provide a seat for a suitable fastener such as a C-washer or wire 19 by means of which the turntable is releasably anchored against displacement away from the bearing 11.

Figure 2:
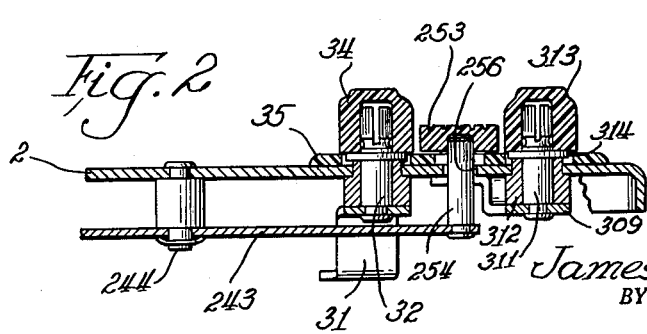
Fig. 2 is a vertical sectional view taken on line 2—2 of Fig. 1.

The turntable is adapted to be operated at a plurality of speeds by a motive unit 21 (Fig. 4). It is supported beneath an aperture 22 in the wall 8 by means including lateral arms 23, on the motive unit, suitably coupled to said wall. The motive unit 21 further includes a driven motor shaft 24 which is belt-coupled to a pair of mobile idlers 26 and 27, differing in diameter from each other, and also differing in diameter from the shaft 24. The pressure of a spring not shown, is employed to urge a rubber tired floating idler 28 into driving engagement with the turntable flange 6, and concurrently with either the shaft 24 or one of the idlers 26 or 27. The means of support for the idlers does not form a part of the present invention, and hence will not be described. The means by which the idlers 26 and 27 are adapted to be operatively moved for driving engagement with idler 28, however, includes a first and movable control arm 29, on the motive unit 21, which is coupled to a second control arm 31 (Fig. 8) pivoted to the base plate at 32, by a link 33. The pivotal connection 32 includes a handle 34 (Fig. 2) which is rigidly coupled, in any suitable manner, to the arm 31 so that by turning said handle the speed can be selected at which it is desired that the turntable should be operated. Desirably, the base plate, besides handle 34, is surmounted by a dial 35 which is appropriately marked by the characters "33" for the 33⅓ r.p.m. microgroove records, "45" for the 45 r.p.m. microgroove records, and "STD" for the older, coarse grooved records adapted to be reproduced at a speed of 78.26 r.p.m. A spindle 36 (Fig. 9) is releasably supported by the sleeve 14. The spindle is anchored against axial displacement by a pin 37 passing through the side of bearing 11, shaft 14 and into engagement with an annular groove 38 about the lower end of the spindle. The pin 37 is biased into engagement with groove 38 by a deflection spring 39 bearing against a flange 41, on pin 37, while anchored to the base plate by means including a stud 42 on wall 8 (Fig. 8). The spindle 36 is also adapted to be secured against displacement angularly of its axis by a second pin 43, on the spindle, which is adapted to be received in notches 44 at the upper end of tubular shaft 14. It will thus be apparent that the spindle is adapted to be removed from its supports by forcibly moving it upward in which operation the groove 38 cams pin 37 outward against the force of spring 39. For positioning the spindle in the sleeve 14, said spindle is provided with a short tapered or beveled portion at 46 by which pin 37 is cammed outward until the position of groove 38 enables said pin to be snapped into engagement therewith.

As magazine means for a stack of records, the spindle 36 is provided with a shoulder 47 (Fig. 11) on which the bottom record of the stack is adapted to rest while also supported, at its periphery, by an ejector head, indicated in its entirety by the character 48. While the records are thus supported, their center holes are threaded over an offset portion 49 in a manner well known in the art.

The ejector head 48 (Fig. 1) includes a casing or shell 51 (Fig. 13), preferably of Bakelite or other suitable plastic material, which is bolted to the base plate 2. The casing supports, in vertical position, a carrier sleeve 52 which is journalled in a bore 53, extending throughout the length of a boss 54 which is an integral part of the shell 51. The sleeve is further supported against lateral play, by a bearing plate 50, the edges of which closely align themselves with the internal walls of the shell 51. Additional support for sleeve 52 includes a thrust washer 56 on the sleeve 52 between boss 54 and a support plate 57, said plate resting on the washer and being rigidly fixed to the upper end of the sleeve in any suitable manner. While the support plate thus resists downward displacement of the sleeve, upward displacement thereof is resisted by means including a retention or index member 58, the structure, mode of attachment to the sleeve and purpose of which will be described hereinafter.

In addition to the function already referred to, the support plate 57 is adapted to provide magazine support for records differing in size, such as those of 10-inch and/or 12-inch diameter at their peripheral edges, while the center holes of the records are threaded over the spindle 36. To understand how this is effected, reference should be made to Figs. 16 and 17 wherein the support plate 57 is shown in top plan view. As will be noted, it is an irregular four-sided figure in general formation and is adapted to be swung, with sleeve 52, between the positions indicated in Figs. 16 and 17. In Fig. 16, a 12-inch record R is shown resting on one of the long edges 59 of plate 57, while in Fig. 17 a 10-inch record R' rests on one of the shorter edges 61, either of these sized records being also supported on the spindle shoulder 47.

Immediately associated with the support plate 57 is an ejector plate, push plate or arm 62 (Fig. 16). It is rigidly supported at one end thereof on an ejector shaft 63 which is, in turn, journalled in the sleeve 52. The push plate 62 is restrained from displacement away from the support plate 57 by a hub portion 64 (Fig. 13) pinned to the lower end of shaft 63 and is positioned adjacent the member 38. Normally, by means later to be described, the push plate is spaced both from edge 59 and edge 61 so that regardless of whether a 10-inch or a 12-inch record is positioned on the magazine, the record will rest on the support plate without interference by the push plate. When, however, the shaft 63 is rocked clockwise (Fig. 16), by means later to be described, a corner 66 of the push plate is swung over the edge 59 to dislodge a bottom record from a stack of 12-inch records, as shown by the dashed lines. Concurrently, in this motion of the push plate, a second corner 67 is carried over the edge 61, which operation is adapted to dislodge a 10-inch record from the spindle (Fig. 17).

Novel means is provided to afford peripheral support for a record smaller than one of 10-inch diameter, such as one of 7-inch diameter, while it is supported at its center by the spindle. Said means involves use of a combined support and ejector mechanism 68 (Figs. 12 and 18). It includes a swingable arm 69 which is pivotally coupled to the pusher arm 62 by means including a screw 71 (Fig. 15) having a head 75. It is threaded in a nut 70 of tubular formation having a head 72 adapted to receive a wrench. The nut 70 passes freely through a spring plate 73 and arms 69 and 62. The screw 71 passes freely through a bushing 74 which, in turn, passes through support plate 57. The bushing 74 is of length, from its upper extremity to a flange 76 at its lower end, slightly greater than the thickness of plate 57. Correspondingly, the nut 70, from its lower extremity to its head 72 is slightly longer than the combined thickness of plate 73, arms 69 and 62 so that when the nut is clamped against bushing 74 by screw 71, the plate 73, arms 69 and 62 have freedom for rotary motion with respect to each other and with respect to plate 57. The bushing 74 further passes through a slot 75' (Fig. 16) in plate 57, which is arcuate of the axis of sleeve 52 both to afford motion of the arm 62 with respect to plate 57 and to movably anchor the arm thereto.

The combined support and ejector mechanism is operable as support for a 7-inch record only when said mechanism is in a predetermined position. This can best be understood by comparing Figs. 16, 17 and 18. The arm 69 is provided with a hole 79 (Fig. 15) and the arm 62 is provided with a pair of smaller diameter angularly spaced holes 81, the three of which are on an arc taken about the axis of screw 71. A ball 82 is received in the hole 79 in arm 69. The ball is of diameter greater than the thickness of arm 69 so that a portion of the ball is adapted to extend alternately into either of the two holes 81 in the ejector arm 62; the holes 81 merely affording seats for the ball since said holes are of diameter smaller than that of the ball. The seating of ball 82 is, of course, assured by force of the spring plate 73, which may, if desired, have a bearing portion provided by a dent or dimple 83 against which the ball rests. A spring washer 80 seated between the screw head 75 and bushing 74 provides additional resilient holding of the bell in its seats. When playing 10-inch and 12-inch records the arm must not, of course, extend over either of the corners 62 or 66. Therefore, it is swung to the position it occupies in Figs. 16 and 17 wherein one of the holes 81 is in engagement with the ball 82. The other of the holes 81 engages the ball when arm 69 is swung to its unfolded position shown in Fig. 18. In swinging the arm 69 between these two positions, forces are exerted which tend to cause displacement of the spring plate 73 edgewise with respect to arm 69. To resist this tendency, the arm 69 bears a pin 84 extending upward into a hole 86 in the spring plate.

Additionally, as a precaution against manually swinging the arm 69 counterclockwise beyond its Fig. 18 position, so that the ball will not drop from hole 79, a stop is employed. This stop may take the form of a lug 87 struck upward from the edge of ejector arm 62 past which the end of the arm 69 will travel freely but which will holdingly engage the side of the arm as it reaches the position of Fig. 18.

The operation of releasing the lowermost record from a stack of 7-inch records supported by the spindle shoulder 47 and free end of arm 69 is carried out as follows: The free end is offset upwardly at 88 (Fig. 12), to provide approximately the same slope for a stack of 7-inch records as for a stack of 10-inch records when they are supported by the spindle 36. Additionally, the arm 69 is slightly L-shaped (Fig. 18) to afford a toe portion 89 on which the peripheral region of a 7-inch record is adapted to rest while the center is supported by the spindle. A heel portion 91, of the arm 69, bears a stud 92 on the upper side thereof which, during record playing is in spaced relationship to the records carried by toe portion 89. The stud 92 should extend upward enough to provide engagement with only the bottommost record of the stack, which is thereby kicked from shoulder 47 when the arm 69 is cyclically moved from its full line to the broken line position Fig. 18, without interference with the record immediately above the bottommost record.

Although records of the 7-inch variety are not susceptible of tipping about their support on the spindle shoulder 47, records of the 10-inch and 12-inch variety are occasionally heavy on one side thus calling for additional means to retain them in engagement with the support plate 57. Therefore, hold-down mechanism is incorporated in the ejector head 48. It includes a bearing cap 93 which may be of molded plastic material such as Bakelite which is anchored to the support plate 57 by screws 94 at one side of said plate. The cap 93 also includes a boss 96 etxending downward from the top thereof, through an aperture 97 in the support plate 57 and into a clearance slot 98, in the top of the casing 51, which is arcuate of the shaft 52. The boss has, coaxially thereof, a bore 99 in which a hold-down shaft 101 is journalled for rotary and axial movement. From the upper end of the shaft 101, a hold-down arm 102 extends laterally. The arm 102 is biased into the position indicated in Fig. 13 by a spring 103 coiled about shaft 101 on which the spring is confined between the lower end of boss 96 and a suitable fastener, such as a C-washer 104 fixed to the lower end of said shaft.

Before records are positioned on the support plate 57, the arm 102 is swung laterally for the sake of clearance. The magazine means provided by the ejector head 48 and spindle 49 having been loaded with a stack of records the arm 102 is lifted, against the resistance of spring 103, swung over the stack of records and lowered into engagement therewith. If desired, one or more resilient contactors 106 may extend down from the outer end of arm 102 to engage the records to avoid scratching the same.

Figure 3:
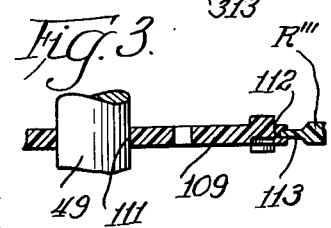
Fig. 3 is a vertical sectional view from line 3—3 of Fig. 1.

Special provision (Figs. 1 and 3) is made for reproducing 7-inch records R''' having a large center hole 107, 1½" in diameter. The center hole of a record of this description is provided with an adapter 108 (Fig. 1) which is no part of the present invention. It should be noted, however, that adapter 108 includes a plurality of legs 109 spiraling outward from a central region through which a hole 111 (Fig. 3) is formed for accommodation of the spindle portion 49. The outer ends of legs 109 have circumferential grooves at 112 (Fig. 3) which are biased into engagement with a complementary edge 113 of reduced thickness and which defines the center hole 107.

The support plate 57, ejector arm 62 and auxiliary arm 69, as previously indicated, are adapted to swing together between the Fig. 16 and Fig. 17 positions, although the arm 62 is movable with respect to plate 57 in the course of a record changing cycle. In order to understand the reason for this, it should be noted that the member 58 (Fig. 12) takes the form of a hub for an index plate 114 thereon, the hub being rigidly clamped to the sleeve 52. Member 64 takes the form of another hub, rigidly associated with shaft 63, and bears a prong plate 116 having a radial arm 117 extending upward. The ejector arm 62 is biased counterclockwise by a tension spring 118 (Fig. 13) anchored between arm 117 and an arm 118 extending downward from the index plate 114, rotation of the ejector arm due to the force of spring 118 being limited by engagement of bushing 74 with one end of the slot 75'.

The support plate 57 and ejector arm 62 are also collectively adapted to be removably retained in either of the stations indicated in Figs. 16 and 17. This is effected by means including a pin 121 (Fig. 8) in association with an L-shaped arm 122 which is adapted to swing about a stud or post 123 on the base plate. Pin 121 extends downward and is biased into engagement with the index plate 115 by a deflection spring 124, one of the ends of which is anchored to the post 123 while its remaining end is pressed against a second stud 126, on plate 2. As the ejector arm 62 and support plate 57 are together rotated between the Fig. 16 and Fig. 17 positions, the pin 121 rides over a smooth unbroken curvilinear edge 120 of index plate 114. As the support plate 57 is swung to the Fig. 16 positions, pin 121 concurrently moves over edge 120 and is snapped into a notch 127 in the index plate 114. Similarly, moving the support plate to its Fig. 17 position carries a second notch 128, on the index plate, to a point where it is adapted to be releasably engaged by the pin 121. Adjacent sides of the notches 127 and 128 are of such formation that they readily move the pin out of engagement with them as the index plate is manually rotated.

The position of pin 121 with respect to post 123 is adapted to be adjusted to compensate for deficiencies in manufacture. Therefore, pin 121 is not carried directly by the L-shaped arm 122. Instead, it is carried at one end of a link 129, the opposite end of which is pivoted at 131 to the free end of L-shaped arm 122. Between its respective ends, link 129 has a short slot 132 (Fig. 8a) through which loosely passes a screw 134 threaded in the arm 122. By loosening screw 134 and then moving the support plate 57 to the most desired position with respect to spindle 49 before screw 134 is again tightened, it is possible to compensate for angular irregularities in the positions of the support and push plate. If desired, a lock washer 130 may be used on the screw 134 to secure link 129 more tightly to arm 122.

The ejector arm 62 is operated against the resistance of spring 118. This is effected as a lever 136 (Figs. 8 and 12) is swung about a pin 137 on the base plate wall 8, the swinging motion being imparted to the lever by cyclically operative mechanism to be described hereinafter. For translating swinging of lever 136 into rocking motion of shaft 63, the prong plate bears a pair of prongs 138 and 139 (Fig. 12) somewhat below the plane in which the adjacent end of lever 136 is adapted to swing. The prong 138 has a cam surface 141 adapted to be operatively engaged by a follower 142 on the end of lever 136, when the support plate 57 is positioned for support of a 12-inch record. Similarly, the prong 139 has a cam surface 143. In operation, as the follower 142 is carried laterally by movement of the lever 136, it engages one or the other of the cam surfaces 141 and 143 dependent on the size of record being played. As the lever 136 is moved still further, the follower 142 slides on the cam surface and causes the prong plate 116 to turn the shaft 63, thus operating the ejector. As noted, the cam surface will be kept in spring pressed engagement with the follower by the spring 118 which will also cause the ejector arm 62 to return to its original position as the lever 136 is swung back.

The record player includes a pick-up arm 144 supported by a pedestal 146, bolted to the base plate 2 (Fig. 9). The pedestal is formed of some suitable plastic material, such as Bakelite with a bushing 147 molded therein extending downward to a point below the level of the base plate. The bushing 147 affords bearing support for a sleeve 148 downward displacement of which, with respect to the pedestal, is resisted by a hub 149 clamped to the upper end thereof. The hub also being spaced from the bushing by a bearing washer 151. Upward displacement of sleeve 148 with respect to the pedestal is prevented by an arm control lever or crank arm 152, rigidly coupled to the sleeve, and spaced from the bushing 148 by an annular spacer 153.

The upper end of hub 149 bears a pair of arms 154 which extend away from each other, thence upwardly and are embraced by a pair of arms 156 extending downward from a pivot plate 157. A pin 161, passing through the arms 156 and 154, affords a horizontal axis about which the pickup arm is adapted to rock. The plate 157 is pivotally secured at 158 to a carrier plate 159 attached, in any suitable manner, to the pickup arm 144. An ear 162 (Fig. 10) bent downward from plate 159, is opposite an ear 163 in downward extension from the plate 157. The ears are coupled by an adjustment screw 164 which passes freely through ear 162, but is threaded in ear 163. Thus, the screw 164 serves to draw the ears toward each other to move the pickup arm 144 in one direction about pivot 158. A compression spring, not shown, coiled about screw 164 between the ears, is utilized to swing the pickup arm in the opposite direction about pivot 158 when the clamping force of screw 164 is relieved. The pickup arm, therefore, may be effectively adjusted about pivot 158, independently of sleeve 148 for proper initial engagement of the pickup arm with the beginning of the sound groove of a record. Means by which the pickup arm is moved automatically will be described hereinafter.

The pickup arm 144 is adapted to be rocked automatically in response to movement of a vertically effective cam 166 (Fig. 9). This cam is carried by a swing-out mechanism which is indicated in its entirety by the reference character 167 and includes a swing-out plate 168 (Figs. 19 and 20) which is triangular in general contour and which is adapted to be swung about an axis provided by a pin 169 on the base plate 2. That edge of plate 168 which is remote from pin 169 is arcuate of the pin in order that the plate may be additionally supported as follows: A stud 171 extends downward from the base plate 2 (Fig. 21) adjacent the edge of the plate. The lower end of the stud is of reduced diameter to provide a neck 172 and a shoulder 173. During its motion, the plate 168 is confined between shoulder 173 and a washer 174 on neck 172, the washer being fastened on the neck by a C-washer 176.

The horizontal angular motion of swing-out mechanism 167 is translated into vertical motion of a lift pin 177 (Fig. 9), slidably journalled in the sleeve 148, by the cam 166. The pin 177 bears at its upper end an arm 178 (Fig. 10) in the free end of which is threaded an adjustment screw 179 adapted to engage the plate 157 and to thereby rock the pickup arm about pin 161 as cam 166 is operated in a manner well-known in the art.

The operation of the swing-out mechanism 167 is cyclical and is effected by a master cam 181 (Fig. 8) the support of which will later be described in detail. Motion from the master cam 181 is conveyed to the swing-out mechanism 167 by a link 182 which is slidably anchored to the base plate and pivotally coupled to plate 168 by a pin 183 thereon. Additionally, the pin 183 provides, together with a post 184, support for a tension spring 186 to bias a follower 192, on the end of link 182, toward cam 181 for cooperation therewith. The link 182 is coupled to the base plate by a stud 188 on the wall 8, which extends through a slot 189 in said link, a fastener 191 on the stud precluding removal of the link therefrom.

The master cam 181 is intermittently driven from the constantly driven turntable hub 9. The means used to accomplish this is most clearly shown in Fig. 9 wherein it will be noted that a bushing 193 is rigidly fastened to the wall 8 in any convenient manner. The bushing 193 provides bearing support for a stub shaft 194 having a lower end portion partly defined by opposed flat surfaces 196 which cooperate with complementary surfaces on the cam through which the surfaces 196 extend to resist rotation of the cam on said shaft, a screw 197, washer 198 and lock washer 199 also being provided to secure the cam to the stub shaft. At its upper end, the stub shaft 194 is of reduced diameter at 201, thereby providing a shoulder 202 against which a mutilated gear 203 is clamped in any convenient manner, such as by a C-washer 204. Flat surfaces, similar to the surfaces 196, may also be provided to prevent the gear 203 from turning on the shaft 201.

The gear 203 has a blank space 206 (Fig. 4) at its periphery. The blank space is normally stationed, during record playing, adjacent a pinion 207 formed at the lower end of the turntable hub 9. This position is maintained by means including a lever 208 having a notch 209 on one edge adjacent its end. The arm 208 is biased counterclockwise about a pivot 211, on wall 8, by a tension spring 212 but is limited in its counterclockwise motion by stop means taking the form of a pin 213 on the wall 8. The notch 209 is adapted to be engaged by a pin 214 extending downwardly from the lower side of gear 203 so that as the pin 214 is carried through its orbit in the course of a cycle of motion, it rides over the edge of arm 208 which is thereby moved against resistance of spring 212 until the notch 209 is engaged by pin 214, at which time the blank space 206 being opposite pinion 207 there is no driving relationship between pinion and gear.

In order to start the gear 203, it must be moved sufficiently far for the teeth of the gear to mesh with the driven pinion 207. Therefore, special mechanism, carried by the gear 203, is provided to move the blank 206 past pinion 207. Suitable mechanism for doing so includes a stud shaft 216 (Fig. 7) carried by gear 203 adjacent the periphery thereof. Shaft 216 extends through the gear 203 and has a flange 217 which rests against the upper side of gear 203. Just below the gear, the shaft is pinched by a C-washer 218 at an annular groove 219 to anchor the shaft to the gear. From the flange 217, shaft 216 extends through and provides a bearing for an actuator lever 221 and a preset lever 222, both of which are retained on shaft 216 preferably by a C-washer 223 between which and lever 221 the shaft carries a plain washer 224 and a resilient washer 226. Because of the force of washer 226, there is enough friction between the levers 221 and 222 so that the lever 222, when moved, is adapted to carry with it the lever 221, although one of the levers is adapted to be moved relative to the other by mechanism later to be described. The extent to which lever 221 will swing about shaft 216 is limited by a pin 227 (Fig. 5) extending upward from gear 203 through an aperture 228 in lever 221, of diameter substantially greater than the diameter of pin 227. Thus, the movement of the lever 221 is greatly restricted while the lever 222 may be swung through a considerable arc.

An abutment lug 229 is struck upwardly from the lever 221 and is adapted to occupy two distinct positions at the limits of the restricted movement of that lever. The lug 229 extends into a horizontal plane through which a striker member 231 (Fig. 4) on the hub 9 is carried with the turntable hub 9. Normally, that is, when a record is being reproduced, lug 229 is positioned outside the orbit through which striker 231 is carried. When, however, lever 221 is moved counterclockwise to its other limit of movement, lug 229 is carried into the orbit of striker 231 which moves the gear sufficiently to carry the teeth into mesh with pinion 207. Thereupon the gear 203 is driven through a single revolution until pin 214 is intercepted by notch 209 on lever 208 and the blank 206 is again stationed at the pinion. Lever 221 may be swung from its inactive position to its operative position to initiate cyclic motion of gear 203 either manually or automatically.

The automatic means by which cyclic motion is initiated is best shown in Figs. 4 to 8 inclusive. Therein it will be noted that the base plate 2 is apertured at 232 in order that a longitudinally slidable member 233 may have freedom of movement under the base plate 2 and over the wall 8. Additionally, member 233 is offset at 234 (Fig. 9) so that it may pass over the gear 203 and levers 221 and 222. The movement of member 233 may preferably be in a course diametrical of the axis of gear 203. This is assured by a stud 236, on wall 8 adjacent aperture 232, which passes through a first slot 237, in member 233, and a section 238 of shaft 194, additionally reduced in diameter, which passes through a second slot 239 in the slidable member. Suitable means such as C-washers 241 are provided on section 238 and stud 236 to resist removal of member 233 from its supports.

At the beginning of reproduction of a record, the slidable member 233 is in the position in which it is indicated in Fig. 4. In that position, a follower 242, extending downward from the end of slidable member 233, is in spaced relationship to the lever 222. As the pickup arm 144 is carried inwardly by the sound grooves of the record it is tracking, the slidable member 233 is gradually carried outward, the means by which this pickup arm motion is communicated to the member 233 being described hereinafter. In the course of its outward movement, follower 242 engages lever 222 which is rotated counterclockwise carrying the lever 221 with it. This movement results in the lug 229 being carried toward the orbit of striker 231. At the point of initial engagement of lever 222 by stud 242, the levers 221 and 222 are in extended or unfolded relationship to each other; that is, lever 221 occupies a position beyond which it may be rotated no farther counterclockwise because of the stud 227. The follower 242 first engages the lever 222 toward the end of the sound grooves. The initial engagement of lug 229 by striker 231 is not, however, adequate to move gear 203 since the engagement is of a brushing nature, the slightly rounded tip of the striker 231 merely brushing back the lever 221, and merely produces an ever increasing folding relationship between the levers at each rotation of the turntable. When, however, the pickup arm enters the trip groove of a record, the movement of lug 229 takes place at a much faster rate and is carried inwardly so far and so quickly before the striker has a chance to engage it that when eventually the striker does engage the lug, it is engaged not by the tip of the striker, but by the radial side thereof. A push is thus delivered to the lug which is translated into an increment of rotary motion of the gear and this increment of motion is adequate to provide meshing engagement thereof with the pinion 207 for a revolution of said gear.

As was previously indicated, a cycle of rotation of gear 203 is adapted to be initiated manually. The means by which this is carried out includes a lever 243 (Fig. 4). It extends beneath the base plate 2 to which it is pivoted at 244. Additionally, lever 243 extends through a clearance aperture 246 to an offset 247, which is required so that the lever is adapted to reach over the levers 221 and 222. A pin 248 on the lower side of lever 243 extends through a slot 249, in wall 8, while a tension spring 251 anchored to said pin below wall 8 is adapted to bias the lever counterclockwise, movement thereof being limited by the edge of slot 249. At its inner end, the lever 243 carries a stud 250 which extends downward and is adapted to be carried into engagement with a cam shaped surface 252 on the lever 221. This may be carried out by moving a handle 253, above the base plate 2, against the resistance of spring 251, since the handle is coupled to the lever 243 by a vertical rod 254 (Fig. 2) in extension through a slot 256 in the base plate 2. It will now be noted that, as stud 250 is carried from its normal position and into engagement with cam surface 252, lever 221 is moved from its normal position, counterclockwise, in which operation lug 229 is carried into the position wherein it is adapted to be operatively engaged by striker member 231. This operation can, of course, be performed at any time during the operation of the record player and results in manipulation of the pickup arm automatically, accompanied by release of a record from the ejector mechanism 48 and the spindle 49.

In the course of a single revolution of gear 203, levers 221 and 222 are returned to their original or normal positions. This is carried out as follows: As meshing engagement between gear 203 and pinion 207 is initiated lever 222 is carried against follower 242 and rotated counterclockwise to the position in which it is indicated in Fig. 5. After lever 222 has been thus swing counterclockwise, and before said lever has been carried out of engagement with follower 242, the direction of motion of member 233 is reversed, by mechanism later to be described. This operation, of course, entails additional folding relationship between levers 221 and 222 during which a cam portion 257 at one edge of lever 222 is extended beyond the teeth of gear 203. At this point in the rotation of gear 203, lever 221 is in one of its extreme positions. In the course of additional gear rotation cam portion 257 strikes a stop 258 which serves to swing lever 222 back to its normal position in which operation friction between levers 221 and 222 is adequate to return lever 221 to its normal position. With the exception of the operation of lever 208, in arresting motion of gear 203, as already described, this is the order of operation of the mechanism by which a record changing cycle is carried out.

As was previously indicated, sleeve 148 (Fig. 9) carries a crank arm 152. It is of novel construction and bears at its free end a crank pin 259 (Fig. 20) extending downward. The pin 259, arm 152 and sleeve 148, in assembly, may be referred to as a crank mechanism 261. As mechanism 261 is carried by the pickup arm in the course of playing a record, the pin 259 is carried into engagement with a lug or hook 262, laterally of the end of member 233 which is thereby moved outwardly from its normal position to one of its extreme positions. This movement causes the stud 242 to trip the lever 222 and start the mechanism as described above. In the course of this movement, the slidable member 233 carries a pin 264, extending downward from the outer end of said member, into juxtaposition with a feeler member 263, extending horizontally from the arm 168, so that the pin 264 is in readiness to be engaged by the feeler immediately the swing-out mechanism starts its cyclic motion. This ensuing motion of the feeler 263 returns member 233 to its normal position. Preferably, the feeler 263 may be of resilient material such as steel piano wire both because of the possibility of premature engagement of the feeler by the pin 264 and also as a safety precaution should the movement of pickup arm 144 be arbitrarily resisted manually while gear 203 is in motion. In the latter case, the feeler member 263 is adapted to bend and eventually return to its original form without undergoing deformation or fracture when the pickup arm is released.

In order that the pickup arm may be manipulated when a record is rejected, the plate 168 is provided with a slot 266 which is arcuate of the pivot 169 of the swing-out mechanism. One end of the slot 266 is covered by a safety contactor 267 adapted to swing about the pin 183 on which the contactor is retained in any convenient manner. The contactor 267 is normally adapted to occupy a predetermined position with respect to plate 168 which is maintained by a pin 269, on plate 168, against which the contactor is biased by a tension spring 271 anchored between a second pin 272, on plate 168, and an ear 273 on the contactor 267. During reproduction of a record the swing-out mechanism 167 occupies approximately the position in which it is shown in Fig. 20. When, however, cyclic motion of the swing-out mechanism has been initiated, and the pickup arm 144 consequently rocked upward by the lift cam 166, the contactor 267 is carried into engagement with a pin 274 on the crank arm 152, the pin 274 being adapted to be carried laterally within the limits of slot 266. The clockwise motion of the swing-out mechanism 167 is thus communicated to the pickup arm, to swing it outward, by cooperation between the contactor and pin 274. Under normal conditions when playing records, the tension of spring 271 is adequate to maintain engagement between contactor 267 and pin 269. Should the pickup arm be grasped and held stationary, however, while the swing out mechanism is being rotated through the clockwise part of its cycle the contactor 168 is moved away from pin 269 but is, of course, adapted to be eventually returned to its position of abutment with said pin when the pickup arm is released, without any of the parts undergoing deformation or fracture.

Figure 26:
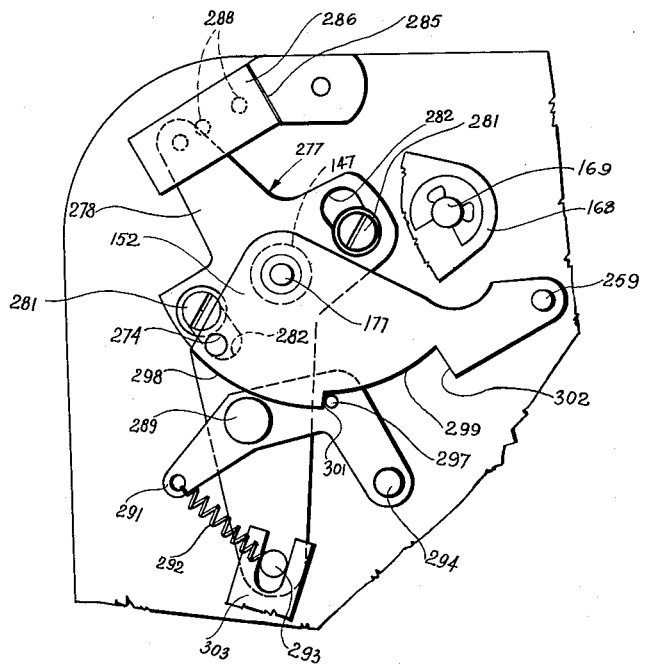
Fig. 26 is a view similar to Fig. 19, parts being broken away to show the pickup arm positioning cams.

To govern the position of the pickup arm 144 once it has been automaically removed from engagement with a record it has been tracking, a positioning mechanism 277 (Figs. 9 and 26) is provided. It is associated with the bushing 147 of the pickup arm pedestal 146 and comprises a carrier lever 278 which is apertured, centrally thereof, by a hole 279 through which the bushing extends as a bearing for the positioning mechanism. Said mechanism is intimately associated with the base plate 2 by a pair of screws 281, threaded therein, but passing freely through a pair of slots 282 (Fig. 19) in the carrier lever 278, the slots being arcuate of the axis of bushing 147. For a reason later to be indicated, carrier lever 278 is adapted to be releasably retained in any one of three predetermined positions with respect to the base plate 2. This is effected by detent means comprising a ball 283 (Fig. 9) which is carried in a hole 284, at one end of lever 278. The ball 283 is retained in the hole 284 by a bracket 286, on the base plate 2, which is offset at 285 so that it is adapted to extend beneath the arm 278. The bracket 286 is of resilient metal so that it is adapted to press ball 283 yieldably into engagement with one of three seats provided by holes 288, in the base plate of diameter less than the diameter of the ball 283. Each of the holes 288 is at one of the predetermined positions which lever 278 is adapted to occupy. Since the holes 288 are on an arc through which the ball is swingable, the force of the spring plate is adapted to retain lever 278 in any one of the foregoing positions until moved manually therefrom through means to be described hereinafter. Remote from the spring plate 286 and the sleeve 147, lever 278 bears, pivoted thereto at 289, a bell crank lever or follower lever 291. Lever 291 is biased counterclockwise about its pivotal axis by a tension spring 292 anchored between one end of said lever and a coupling pin 293 extending downward from one end of lever 278. During reproduction of a record, the spring 292 is responsible for engagement of a follower 294, on another end of lever 291, with a cam surface 296 at the edge of the contactor 267 (Fig. 8). During this association of the cam surface and follower a second follower 297, is extending downwardly from the lever 291 is retained in disengaged relationship to the crank arm 152. When cyclic operation of the mutilated gear 203 has been initiated, however, the spring 292 moves follower 297 into cooperative association with the crank arm 152. This is due to the outward or clockwise motion (Fig. 19) of the swing-out mechanism during which cam surface 296 is carried out of engagement with the follower 294. By the time this operation has taken place, pickup arm 144 has been lifted out of engagement with the record it has been tracking by the previously described mechanism including the cam 166. Just before cam 296 is disengaged from the follower 294, follower 297 is engaged by the crank arm 152 with which there is adequate friction to resist any tendency on the part of the pickup arm to oscillate about its vertical axis, assuming the base plate to be substantially level when the pickup arm is freed from engagement with the record. After the contactor member 267 has been carried away from follower 294, it engages pin 274 to swing crank arm 291 with respect to follower 297. This involves movement of a cam surface 298, in engagement with follower 297, until passing of a shoulder 301, at the end of said cam surface, enables the follower to snap into engagement with another cam surface 299 (Fig. 26). Cam 299 extends in a spiral manner, with respect to the axis of lift pin 177, from the shoulder 301 to a second shoulder 302, on the crank arm, the function of which, among others, will now be described.

Safety devices to protect the mechanism when the pickup arm is moved improperly is provided by the structure of the swing-out mechanism 167 and crank mechanism 152. If, for instance, the pickup arm is moved outwardly beyond the record it is playing, pin 274 on the crank arm would be carried clockwise to the end of slot 266 where it would engage plate 168 of the swing-out mechanism which would be swung against the resistance of spring 186. At the same time, the cam surface 299 engages the follower 297 which is thereby displaced clockwise about pivot 289 aganst the resistance of spring 292 until the movement of the pickup arm is limited to engagement of shoulder 302 with follower 297. On release of the pickup arm the spring 292 returns the follower to the position governed by follower 274 as it engages the contactor 267, without injury to any of the machine parts. From its position at any point while in engagement with a record the pickup arm may, of course, be removed inward as far as engagement with the spindle will permit the pickup arm to be moved. As has already been explained, the spring 271 is adapted to undergo elongation to permit the pickup arm to be arbitrarily held stationary during a record changing cycle. Movement of the pickup arm inwardly during a changing cycle results in the same effects on the mechanism, since the slot 266 is so proportioned that movement of the pin 274 and therefore of the pickup arm inwardly is never restrained thereby. The only inward restraint being by the plate 267 in response to the urging of the spring 292.

Cooperation between shoulder 301, on the crank arm 152 and follower 297 determines the point at which the pickup arm is stopped on its inward movement at the end of a record changing cycle. During the cycle, the pickup arm is held in a raised position by the action of the lift cam 166. In this position, it may be moved laterally by engagement between the cams and followers in connection with the crank arm 152. As the arm is swung outward by the engagement between the plate 267 and pin 274, the follower pin 297 comes into engagement with the surface of the plate 267 and at the end of the outward swing will be engaged with the cam surface 199. As the master cam 181 allows spring 186 to return the swing-out mechanism 167 to its position, the spring 292 will cause the follower 297 to press on the spiral cam surfaces 259, causing the crank member 152 to rotate the pickup arm inwardly until the follower reaches the shoulder 301. Here the arm is normally retained by the shoulder until lowered by the cam 166 to start playing the next record.

The force of spring 292 tending to move the pickup arm further is resisted by engagement between the follower 297 and shoulder 301, as just described. However, because of the shallow notch provided by the shoulder 301, and because of the slight slope of the shoulder, the pickup arm is not held positively. Arbitrary manual movement inwardly will cause the follower 297 to ride up the shoulder 301 onto the surfaces 298. The shoulder 302, in contrast to the shoulder 301, is much higher and provides with cam 299, a hook means adequate to retain the crank arm in engagement with follower 297 when said crank arm is moved clockwise if the pickup arm is moved arbitrarily outward.

Figure 27:
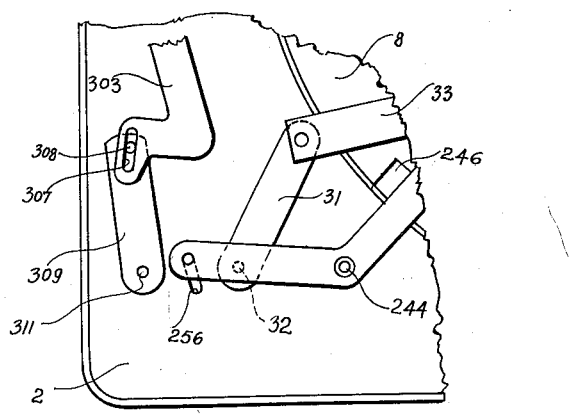
Fig. 27 is a bottom plan view of the speed and positioning controls showing them in a position different from that of Fig. 2.

The point of engagement of follower 297 with shoulder 301 determines the let-down of the pickup arm as described above. Since the pickup arm is adapted to be automatically carried into initial engagement with 12-inch, 10-inch and 7-inch records, it follows that mechanism must be provided to vary the position of engagement, with respect to the turntable and, therefore, to base plate 2, of follower 297 with shoulder 301 as the pickup arm is swung inwardly. The means by which this variation is accomplished comprises an intermediate lever 303 (Fig. 8) which is pivoted at 304 to the base plate 2. At one end, the lever 303 is bifurcated as at 306 for operative coupling with the pin 293 while its remaining end is apertured by a slot 307 through which extends a pin 308 carried by a control arm 309. The arm 309 is rigidly fixed to the lower end of a stub shaft 311 (Fig. 2) which is journalled in a vertical bushing 312, fixed to base plate 2, while at its upper end said shaft bears a handle 313, suitable means being also employed on the shaft to prevent displacement thereof from the bushing such as a C-washer 314 between said bushing and handle. It will now be apparent that by manually rotating the handle 313 (Fig. 1), the lever 309 may be turned from the position shown in Fig. 8 to that of Fig. 27. Lever 303 will then be moved, causing the movement of the lever 278 from its position in Fig. 20 to that shown in Fig. 19. Adjacent the handle 313, dial 35 is appropriately marked with suitable indicia, "7, 10 and 12" to one of which the handle is adapted to be turned when it is desired to select a let-down position for the pickup arm which is suitable for the size of record which it is desired that said pickup arm initially engage.

In the alternative embodiment disclosed in Figs. 22 to 25 inclusive, the let down position of the pickup arm and the speed of the turntable are adapted to be varied concurrently by cam means. In this connection, a base plate 316 rigidly supports a bushing 317 passing therethrough. A pintle 318 is journalled in the bushing and carries at its lower end, a cam 319. A control knob 321 is fixed to the upper end of the pintle as a means by which the cam is adapted to be rotated. Cam 319 is of irregular formation and is preferably struck from some suitable sheet metal. The cam is apertured, centrally thereof, by a hole 322 adapted to receive a section 323 of reduced diameter of the lower end of hub 318. Section 323 is further provided with opposed flat surfaces 324 for intimate association with complementary internal opposed flat surfaces 326 on the walls of the hole 322 to resist turning of the cam with respect to its pintle or hub 318. A special screw 327 holds the cam plate 319 to the pintle 318. This screw 327 is of unusual construction in that it includes a head 328 from opposite sides of which a threaded portion 329 and a stud portion 331 extend. The head 328 is adapted to receive a wrench, and the threaded portion 329 is, therefore, adapted to draw cam 319 tightly in place. The stud portion 331 extends through a slot 332 in a link 333 which is a counterpart of the link 33 of the previously described mechanism. Link 333 is supported by a plain washer 334 and thereunder, a C-washer 336 on the stud 331. Thus, the link 333 is adapted to slide freely over the stud 331 for conveying movement for varying the speed of the motive unit. In order that this may be effected, link 333 carries, on its upper surface, a stud or follower 337 which extends into a cam slot 338 in the cam 319. In the position indicated (Fig. 24), the follower 337 is engaged by a portion of the slot which provides for a turntable speed of approximately 78 r.p.m. As the cam 319 is rotated clockwise (Fig. 24), by the handle 321, a portion of cam slot 338, identified by the character 339, is carried over follower 337 drawing it closer to the axis of hub 318 so that the turntable is operated at a speed of 33⅓ r.p.m. In turning the cam plate 319 counterclockwise from the Fig. 24 position another portion of cam slot identified by 341 is carried over the follower 337 thus moving the follower farther away from the axis of the dial hub 318 to change the turntable speed to 45 r.p.m. The upper side of the dial is appropriately marked by indicia "33, STD, and 45" indicating the speeds just referred to. These indicia, when turned to a stationary pointer or dot 342 on base plate 316, indicate the speed at which the turntable will be driven.

As has already been indicated, the angular position at which the pickup arm is adapted initially to engage a record is varied concurrently with variations of the turntable speed. In this alternative embodiment, this is effected by a second cam slot 343, in the cam plate 319, in which is received a pin or follower 344 carried at one end of a lever 346 corresponding to the intermediate lever 303, previously described. As the cam 319 is rotated by the knob 321, as previously explained, the lever 346 is rocked about its fulcrum pin 347 on the base plate 316.

The means by which the mechanism for manually rejecting a record is coordinated with the let-down and speed regulatory mechanism comprises an annular member 348. For its association with knob 321, said knob is undercut at 349, the smaller diameter portion extending through member 348. A pair of handles or contactor arms 351 on member 348 extends beyond the periphery of the knob 321, the ends of the arms being preferably knurled for engagement by the fingers of an operator. From the lower side of member 348, a pin 352 extends downward through a slot 353 in the base plate 316. Pin 352 is adapted to engage a lever 354 pivoted at 356 to the base plate 316. Lever 354 is the counterpart of lever 243 and is biased by spring pressure, not shown, clockwise about pivot 356, and into engagement with the pin 352 which is thereby biased to one end of the slot 353. By rotating the annular member 348 against the force of the lever 354, thereby swinging said lever counterclockwise, a record changing cycle is initiated. After the arms 351 having been released, they are returned to their original position by lever 354.

If desired, the arms 351 may bear some suitable indicia, as depicted in Fig. 22, for identification of this control and to indicate the manner of its use.

While I have described my invention in an embodiment thereof, I am aware that numerous and extensive departures may be made therefrom without departing from the spirit or scope of my invention.

I claim:

1. In a record player having a pickup arm in association with a turntable on which a record is adapted to be played, said pickup arm being moved inwardly at a substantially uniform angular velocity when the record is being reproduced during which operation the blank space of a mutilated drivable member is detained adjacent a driver member which is drivingly associated with the turntable and a striker member carried about the axis of the turntable adapted to convey motion to rotate the drivable member into driving engagement with the driver to cause the pickup to be manipulated through a cycle of motion, the combination of, a crank arm coupled to the pickup arm for movement laterally therewith, trip means including a slider member in association with the drivable member and adapted to occupy a normal position during record playing, said slider being adapted to be moved away from its normal position by said crank arm as said pickup arm is moved inwardly, a first trigger element, a second trigger element, anchor means by which said elements are movably anchored to said drivable member, said elements being frictionally engaged with each other, said elements occupying a first position with respect to each other at the start of reproduction of a record free of engagement by said striker and said slider members, said slider member being adapted to engage said first element to move it upon being moved to a predetermined position by said crank arm, said second element being moved with said first element, said striker member being formed to move said second element back to its original position at each revolution of said turntable for slight movements of said second element, said striker member also being formed for driving engagement with said second element if said second element is moved inward more than a predetermined amount by said first element to initiate driving engagement between said driver and drivable members.

2. In a record player having a pickup arm in association with a turntable on which a record is adapted to be played, said pickup arm being moved inwardly at a substantially uniform angular velocity when the record is being reproduced during which operation the blank space of a mutilated drivable member is detained adjacent a driver member which is drivingly associated with the turntable and a striker member carried about the axis of the turntable adapted to convey motion to rotate the drivable member into driving engagement with the driver to cause the pickup arm to be manipulated through a cycle of motion, the combination of, means including a crank arm coupled to the pickup arm for movement laterally therewith, a slidable link, anchor means at the axis of said drivable member by which said link is anchored for slidable movement relative to said drivable member, said link being adapted to be moved by said crank mechanism as said pickup arm is moved inwardly, a drive lever, a positioning lever, pivotal means on said drivable member by which said levers are adapted to swing about a common axis, resilient means in connection with said pivotal means by which both of said levers are adapted to be displaceably retained in positioned relationship to each other by frictional engagement, said levers being adapted to occupy a spread apart position with respect to each other at the start of reproduction of a record during which said levers are free of engagement by said striker and said link, said levers being adapted to be moved to a folded position on engagement of said positioning lever by said link as it is moved beyond a predetermined position thereof during an advanced stage in reproduction of a record and intermittent concurrent engagement of said drive lever by said striker member, said levers being adapted to be then moved to a spread apart position by abnormal rate of movement of said link when the pickup arm is engaged by the trip groove of a record, said drive lever thereupon being adapted to be drivingly engaged by said striker to move the drivable member through an increment of motion into driving engagement with said driver for cyclic motion of said drivable member.

3. In a record player comprising a base member on which is operatively carried a pickup arm for cooperation with a record supported by the turntable also carried by the base plate, the pickup arm being adapted to be moved inwardly at a uniform rate by the record when it is being reproduced during which operation the blank space of a mutilated drivable member is adjacent a driver member which is drivingly associated with the turntable and a striker member carried about the axis of the turntable adapted to convey motion to rotate the drivable member into driving engagement with the driver to manipulate the pickup arm through a cycle of motion by mechanism including a crank arm coupled to the pickup arm for movement laterally therewith, in combination, trip means including a movable link member movably anchored to the base member, an extendable actuator mechanism carried by said drivable member, said actuator mechanism being spaced from both the orbit of said striker member and also said slider member at the start of reproduction of a record, said actuator mechanism being adapted to be extended abruptly into the orbit of said striker member by movement of said link when the pickup arm is engaged by the trip groove of a record, said extendable mechanism thereupon being adapted to be drivingly engaged by said striker member to move the drivable member into driving engagement with the driver member for cyclic motion of said drivable member, and detent means coupled to the base member for releasably retaining said drivable member with the blank space thereof adjacent said driver when said drivable member has completed a cycle of motion.

4. In a record player comprising a base member on which is operatively carried a pickup arm for cooperation with a record supported by a turntable also carried by the base plate, the pickup arm being adapted to be moved inwardly at a uniform rate by the record when it is being reproduced during which operation the blank space of a mutilated drivable member is adapted to be detained adjacent a driver member which is rigidly associated with the turntable and a striker member carried about the axis of the turntable adapted to convey motion to rotate the drivable member into driving engagement with the driver to manipulate the pickup arm through a cycle of motion by means including a swing-out mechanism and a crank arm coupled to the pickup arm for movement laterally therewith, the combination of, an actuator mechanism comprising a first swingable element and a second swingable element, both of the elements being pivoted to the drivable member at a common axis, a longitudinally slidable member in slidable relationship to the drivable member to communicate motion from the crank arm to one of the elements, said other element being moved into the course of said striker member when the pickup arm enters the trip groove of a record, said driver member being thereby adapted to communicate an increment of rotary motion to said drivable member to establish driving relationship between said members for a cycle of motion of said drivable member, means by which the first and second swingable elements are adapted to be returned to their original position including an abutment member on said base member, and a cam surface on one of the elements adapted to be engaged by the abutment member.

5. In a record player comprising a base member on which is operatively carried a pickup arm for cooperation with a record supported by a turntable also carried by the base plate, the pickup arm being adapted to be moved inwardly at a uniform rate by the record when it is being reproduced, during which operation the blank space of a mutilated drivable member is detained adjacent a driver member which is rigidly associated with the turntable, and a striker member carried about the axis of the turntable adapted to convey motion to rotate the drivable member into driving engagement with the driver to manipulate the pickup arm through a cycle of motion by means including a swing-out mechanism and a crank arm coupled to the pickup arm for movement laterally therewith, the combination of, actuator mechanism comprising a drive dog, a carrier lever, means on the gear by which the dog and carrier lever are pivotally coupled at a single axis to said gear, means in connection with said last named means by which said dog is displaceably retained in positioned relationship to said carrier lever, link means movably mounted on said base member having an abutment member adapted to engage said carrier lever, said drive dog being disengaged from said striker member and said carrier lever being spaced from the abutment member at the start of reproduction of a record, said link means being adapted to communicate motion from said crank member to said carrier lever when the pickup arm is moved inwardly, said drive dog being adapted to be carried with said carrier member into driving relationship with said striker as said pickup arm reaches the run-out groove of a record, said gear being thereby drivingly associated with said pinion for cyclic operation of said gear, a cam arm on said carrier member, said cam being extended beyond the periphery of the gear as said carrier lever is moved by said abutment member, an extension member on said swing-out mechanism, said extension member being adapted to return said link means to its original position on outward movement of the pickup arm, a stationary abutment member beside said gear, said cam arm being adapted to engage said stationary abutment member to return said carrier arm to the position it occupies at the start of reproduction, and stop means on said gear to limit the movement of said drive dog with said carrier arm to the position said dog is adapted to occupy at the start of reproduction of a record.

6. In a record player comprising a base member on which is operatively carried a pickup arm for reproducing a record supported by a turntable also carried by the base plate, a mutilated gear adapted to be detained adjacent a pinion during playing of a record, said pinion being rigidly associated with the turntable, and a striker member carried about the axis of the turntable adapted to rotate the gear into driving engagement with the pinion at the terminal groove of the record, the pickup arm thereupon being manipulated through a cycle of motion, the combination of, an actuator lever pivoted to the gear, a drive dog also pivoted to said gear at the axis of said actuator lever, means in connection with said gear holding said dog in displaceable relationship to said lever, said dog and said lever being in a predetermined position at the start of reproduction of a record, link means between said lever and the pickup arm by which said drive dog is adapted to be carried away from its predetermined position and into operative engagement with the striker member to rotate the gear into mesh with the pinion, means for manually moving said drive dog into operative engagement with said striker member for effecting meshed relationship between the pinion and gear including a cam surface on said drive dog, a lever pivoted to the base member, a follower on said lever, resilient means coupled to said lever to bias said lever away from engagement with said cam surface, said lever being adapted to be swung manually against the force of said resilient means to carry said follower into engagement with said cam surface to swing said dog into operative engagement with said striker member thereby initiating cyclic motion of said gear, and a fixed abutment member on the base member beside said gear, said actuator lever being adapted to be carried into engagement with said abutment member in the course of cyclic motion of the gear to return said drive dog to its predetermined position.

7. In a record player of the class described including a turntable, and a pickup arm to which is coupled a crank mechanism for movement therewith about a first vertical axis and adapted to be swung in one direction by a swing-out mechanism pivoted for motion about a second vertical axis spaced from the first vertical axis, the pickup arm being adapted to be rocked about a horizontal axis by the swing-out mechanism at the beginning and end of cyclic motion thereof, the combination of, means including a stop shoulder on the crank mechanism to govern the point at which the pickup arm is adapted to be lowered into initial engagement with a record on the turntable, a cam extending from the stop shoulder, positioning mechanism adapted to be swung about said first vertical axis including a spring-biased mobile follower, said follower being biased for movement independently of its movement about said first axis, said pickup arm being adapted to be swung inwardly by pressure engagement of said follower with said cam, said stop shoulder being adapted to arrest motion of said cam with respect to said follower to interrupt inward movement of said pickup arm at a predetermined point with respect to the turntable, continued movement of said swing-out mechanism providing for downward movement of the pickup arm from said predetermined position, and link means including a handle in remotely coupled relationship to the positioning mechanism by which said mechanism is adapted to be moved for selective engagement of the follower and stop shoulder at a plurality of angular positions about said first axis to provide for operative initial engagement with any one of a plurality of sized records on the turntable.

8. In an automatic phonograph of the class described including a base plate for support of a turntable and a pickup arm, crank means coupled to said pickup arm for movement therewith about a first vertical axis and adapted to be swung in one direction by a swing-out mechanism pivoted for motion about a second vertical axis spaced from the first vertical axis, the pickup arm being adapted to be rocked about a horizontal axis by the swing-out mechanism at the beginning and end of cyclic motion thereof, the combination of, means including a stop shoulder on the crank means to govern the point at which the pickup arm is adapted to be lowered into initial engagement with a record on the turntable, a cam in extension from the stop shoulder, positioning means adapted to be swung about said first vertical axis including a spring-biased mobile follower, said follower being biased for movement independently of its movement about said first axis, said pickup arm being adapted to be swung inwardly by pressure engagement of said follower with said cam, said stop shoulder being adapted to arrest motion of said cam with respect to said follower to interrupt inward movement of said pickup arm at a predetermined point with respect to the turntable, continued movement of said swing-out mechanism providing for downward movement of the pickup arm from said predetermined position, link means including a handle above the base plate in remotely coupled relationship to the positioning mechanism by which said mechanism is adapted to be moved for selective engagement of the follower and stop shoulder at a plurality of angular positions about said first axis to provide for operative initial engagement with any one of a plurality of sized records on the turntable, and retention means in connection with said positioning mechanism to releasably retain said mechanism in any one of the positions to which it is turned by said handle.

9. In an automatic record player including a base plate for support of a turntable and a pickup arm, crank mechanism coupled to said pickup arm for movement therewith about a first vertical axis and adapted to be swung in one direction by a swing-out mechanism pivoted for motion about another vertical axis spaced from the first vertical axis, the pickup arm being adapted to be rocked about a horizontal axis by the swing-out mechanism at the beginning and end of cyclic motion thereof, the combination of, an abutment surface in connection with the crank mechanism, a cam in extension from the abutment surface, positioning mechanism adapted to be swung about said first vertical axis including a spring-biased member, coupling means in connection with said spring-biased member by which it is adapted to have movement independently of its movement about said one axis, a follower carried by said spring-biased member, said pickup arm being adapted to be swung inwardly by pressure engagement of said follower over said cam, said abutment surface being adapted to arrest motion of said cam with respect to said follower to interrupt inward movement of said pickup at a predetermined point with respect to the turntable, continued movement of said swing-out mechanism providing for downward movement of the pickup arm from said predetermined position, a plurality of seats on the base plate about said first axis, retention means in connection with said positioning mechanism by which it is adapted to be releasably retained at one of the seats to provide for initial engagement of the pickup arm with a record of one size on the turntable, link means including a handle movably coupled to the base plate at a point remote from said positioning mechanism, said link means being adapted to communicate motion from said handle to said positioning mechanism to station said positioning mechanism at each of the other seats thereby providing for engagement of the follower and abutment surface at other angular points points about said one axis, the pickup arm being thereby capacitated for initial engagement with records of additional sizes on the turntable.

10. The combination with an automatic record player comprising a base plate for support of a turntable and a motive unit adapted to drive the turntable at a selectable speed and a pickup arm adapted to be manipulated through a cycle of motion with respect to the turntable connected to means including variable let-down mechanism, of a rotary cam plate, bearing means by which the cam plate is rotatably coupled to the base plate, first, and second cam surfaces on said cam plate, a first follower connected to the first of said cam surfaces, a second follower connected to the second of said cam surfaces, manual means in communication with the cam plate by which said plate is adapted to be turned, and thereby the positions of said followers varied, link means between said first follower and said motive unit, and link mechanism to couple said second follower to said let-down mechanism for concurrently varying the position of the let-down and turntable speed.

11. In a record player comprising a base plate for support of a turntable and a motive unit arranged to operate the turntable at a plurality of selectable speeds in response to operation of a first selector mechanism and a pickup arm arranged to be manipulated through a cycle of motion to one of a plurality of let-down points selectable by a second selector mechanism, and manually operated initiating means for initiating a cycle of motion, the combination of, means including a pair of concurrently rotatable cams to govern the selection of the first and second selector mechanisms, a follower in connection with each of the selector mechanisms, one of the followers being connected with one of the cams and the other of the followers being connected with the other of the cams, a first handle connected to said cams for rotating them, a second handle rotatably supported by said first handle and contactor means in connection with said second handle, means connected to said contactor means to spring-bias it to a predetermined position, said contactor being arranged to be carried away from its predetermined position by manual movement of said second handle to operate said initiating means.

12. In a record player having a base plate supporting a turntable and pickup arm swingable about a first vertical axis and coupled to a crank arm moved inward by said pickup arm during record tracking and swung outward during a cycle by a swing-out arm swingable about a second vertical axis to swing the pickup arm outward after said pickup arm has been rocked upward by said swingout arm, in combination, a cam on said crank arm extending curvilinearly about said first axis, a first shoulder on said crank arm at one end of said cam, a positioning lever mounted on said base plate to pivot about said first axis, detent mechanism comprising a detent member on said positioning lever, a plurality of detent seats on said base plate, said seats being severally engageable by said detent member to releasably retain said positioning member in a selected position, a handle pivotally surmounting said base plate remote from said positioning lever, link means to couple said handle to said positioning lever whereby the setting of said positioning member may be swung to a different setting by turning said handle, a follower lever pivoted to said positioning lever, a first follower carried by said follower lever, means anchored to said follower lever to bias said first follower toward said cam, a safety contactor carried by said swing-out arm, a second follower arranged on said follower lever for engagement by said safety contactor during record tracking to restrain said first follower from being carried into engagement with said cam thereby freeing said pickup arm to track a record, said safety contactor being carried out of engagement with said second follower by movement of said swing-out arm outward with initiation of a cycle whereby said first follower is freed to be carried into pressure engagement with said cam, an abutment arranged on said crank arm for pressure engagement by said safety contactor following engagement of said cam by said first follower to swing said pickup arm outward, said first follower when still cooperating with said cam precluding movement of said pickup arm beyond a predetermined outermost position thereof by engaging said first shoulder, said first follower pressing on said cam at a point spaced from a vertical plane passing through said first axis and the fulcrum of said follower lever at all settings of said positioning lever to constantly bias said crank arm inwardly and swing said pickup inwardly after said pickup arm has been swung to its outermost position, and a second shoulder on said crank arm at the other end of said cam to determine the set-down of said pickup arm by engaging said first follower thereby to obstruct the inward swing of said pickup arm as said swing out arm is moved inward, the set-down of said pickup arm being selectable by the mobility of said follower lever about said first vertical axis, the set-down setting of said first follower being at predetermined points provided by said detent seats, said seats being arranged for set-down of said pickup arm at the beginning of records differing in size on the turntable.

References Cited in the file of this patent

UNITED STATES PATENTS

| | | |
|---|---|---|
| 2,330,293 | Knox | Sept. 28, 1943 |
| 2,371,362 | Small | Mar. 13, 1945 |
| 2,436,529 | Pressley | Feb. 24, 1948 |
| 2,438,264 | Bender | Mar. 23, 1948 |
| 2,457,106 | Pressley | Dec. 21, 1948 |
| 2,509,811 | Dale | May 30, 1950 |
| 2,558,060 | Rudolph | June 26, 1951 |
| 2,613,081 | Fisher | Oct. 7, 1952 |
| 2,616,703 | Leonard | Nov. 4, 1952 |
| 2,636,742 | Redfield | Apr. 28, 1953 |
| 2,638,349 | Schweitzer | May 12, 1953 |
| 2,650,831 | Fortune | Sept. 1, 1953 |
| 2,662,772 | Dobrogowski et al. | Dec. 15, 1953 |